United States Patent [19]
Clement et al.

[11] Patent Number: 5,229,190
[45] Date of Patent: Jul. 20, 1993

[54] HANDLEABLE CARD AND METHOD OF MANUFACTURE

[75] Inventors: Vaughn M. Clement; Stuart M. Pindell, both of Lancaster; Joseph H. Zilligen, York, all of Pa.

[73] Assignee: All American Image, Inc., Glenside, Pa.

[21] Appl. No.: 848,346

[22] Filed: Mar. 9, 1992

[51] Int. Cl.$^5$ ............................................. B32B 9/00
[52] U.S. Cl. ........................................ 428/195; 428/203; 428/206; 428/207; 428/323; 428/332; 430/43; 430/44; 430/98; 430/126
[58] Field of Search ............... 428/323, 332, 195, 207, 428/203; 430/43, 126, 44, 98

[56] References Cited
U.S. PATENT DOCUMENTS 4,510,225  4/1985  Kuehnle et al. .................. 428/203
4,988,591  1/1991  Winkelmann ..................... 430/43

*Primary Examiner*—Patrick J. Ryan
*Assistant Examiner*—Abraham Bahta
*Attorney, Agent, or Firm*—Jay M. Cantor

[57] ABSTRACT

A card (10) and a method of manufacturing handleable cards includes providing front and back sheets (44, 46) of thin, flexible, opaque material, depositing images on such sheets by electrophotographic process to affix toner particles (14, 32) on the sheet surfaces, adding sheets (16, 24) carrying thermal adhesive (18, 22) and a thickening sheet (20), to provide a core, aligning the images front and back on the sheets, laminating the sheets and core under heat and pressure to bond the sheets into an integral structure and then cutting the sheets to define individual cards.

12 Claims, 3 Drawing Sheets

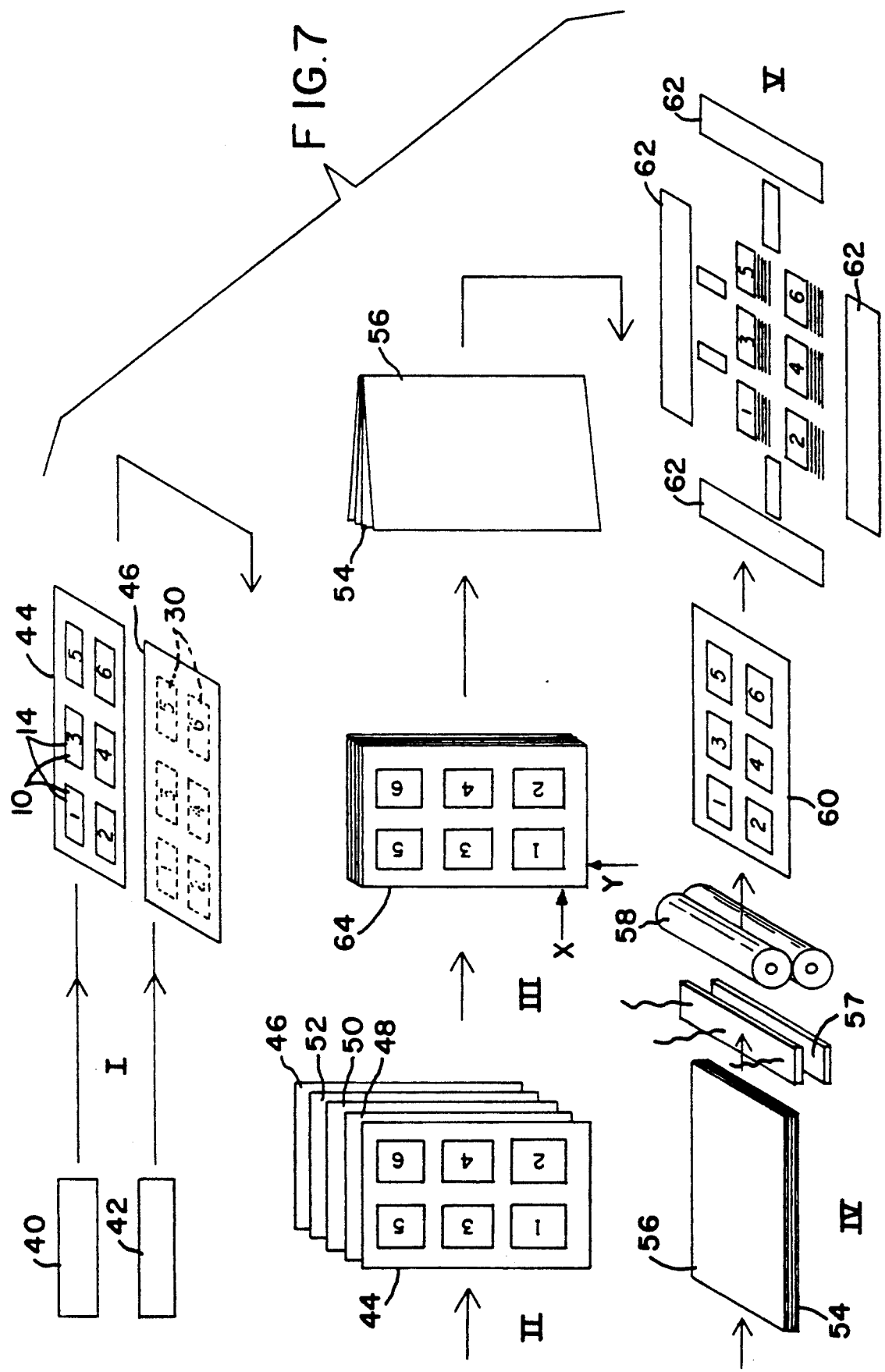

HANDLEABLE CARD AND METHOD OF MANUFACTURE

This invention relates to image bearing handleable cards and a method of manufacture therefor.

BACKGROUND OF THE INVENTION

A variety of image bearing cards exist which must be handleable in the sense of not being readily bent or torn, smudged or cracked when picked up, handed about, held to be examined and read; the cards must be durable. Examples of such cards include postcards, the so-called "sports cards" depicting individuals in athletic poses and numerous other cards carrying frequently the images of people, animals, places, and the like. Such cards are handled, kept, collected, traded, and may very well take on an intrinsic value making their preservation important to the owner. The characteristics of such cards, in terms of dimensions, have evolved driven by either postal regulations as related to postcards or by printing practices and custom evolving from the dimensions of packages originally coupling goods sold with the cards as coupons or inducement to purchase such goods. Postcards have evolved to dimensions on the order of 3½ inches by 5½ inches with a thickness on the order of 0.010 as a maximum for a given postal charge; there being other and larger postcards requiring appropriately different postal rates. Sports cards have evolved to dimensions on the order of 2½ inches by 3½ inches with a thickness on the order of 0.020 inches, or slightly less. Both types of cards have come to require a certain stiffness, feel, and resistance to easily being torn or bent. Quality cards also must have a resistance to smudging, smearing or cracking of the images on the surfaces thereof.

Heretofore, cards, such as postcards and sports cards, have been printed on a stock of the thickness required for appropriate stiffness by utilizing printing techniques, inks, curing and the like to assure a stable image and finish. Prior art practices are acceptable when the volume of cards is sufficient to amortize the relatively expensive set up, composition, and the like to provide a production run. In some cases, the requirements are on the order of hundreds, with a thousand or twelve hundred cards being the minimum order preferred. Orders of a few cards, or a few dozen cards, have not been practical, and have indeed been prohibitive when utilizing the prior art practice.

Accordingly, it is an object of the present invention to provide handleable, image bearing cards and a method of manufacture that is economically feasible for extremely short card runs. It is a further object to provide cards and a method of manufacturing therefor which are high quality, in terms of image durability, yet rendered through a low cost process. It is yet a further object to provide low cost, image bearing handleable cards which have the characteristics of printed cards.

SUMMARY OF THE INVENTION

The invention achieves the foregoing objectives through the provision of cards of a construction manufactured by a method utilizing electrophotographic techniques to provide front and back images on thin, flexible opaque sheets of material with the toner particles suitably fixed by heat and pressure and with the sheets laminated through the addition of a core, including at least a further sheet containing adhesive and with the structure formed thereby into an integral card by a further laminating, through heat and pressure, of the sheets together. The core thickness and characteristics provide, in conjunction with the image bearing sheets, a thickness appropriate to the particular use of the card, and the additional step of tempering of image by compression through pressure and heat has been found to enhance the images formed by toner particles in the sense of making such consistent from card to card, particularly where relatively heavy amounts of toner are required to achieve contrast and color over a large area of a card. The additional step of heat and compression has also been found to improve the characteristics of handling of the cards so that the toner is less likely to be smeared, smudged or cracked through handling.

The invention method contemplates utilizing sheets of an area to allow an electrophotographic deposition of one or multiples of images in multiple colors in conjunction with a core or sheets forming a core of dry, thermal adhesive with the front and back image bearing sheets being aligned in a stack with the adhesive core sheets and subsequently fitted into a carrier to be laminated by being fed through a heat and pressure station. Thereafter, the integral laminate may be cut to define individual cards from the multiple images on the larger sheets, or in certain applications used as is. Temperature and pressure in the additive fixative step of the method are chosen in conjunction with the thermal characteristics of the adhesive and the rate of traverse of the laminar stack through the heat and pressure station to achieve a desired bonding and lamination as well as tempering of the toner image.

IN THE DRAWINGS

FIG. 7 is a schematic view showing the process steps of the method of the invention in the preferred embodiment in relation to sheets carrying multiple images rendered into handleable cards through the process.

DETAILED DESCRIPTION OF THE INVENTION

Figure 1:
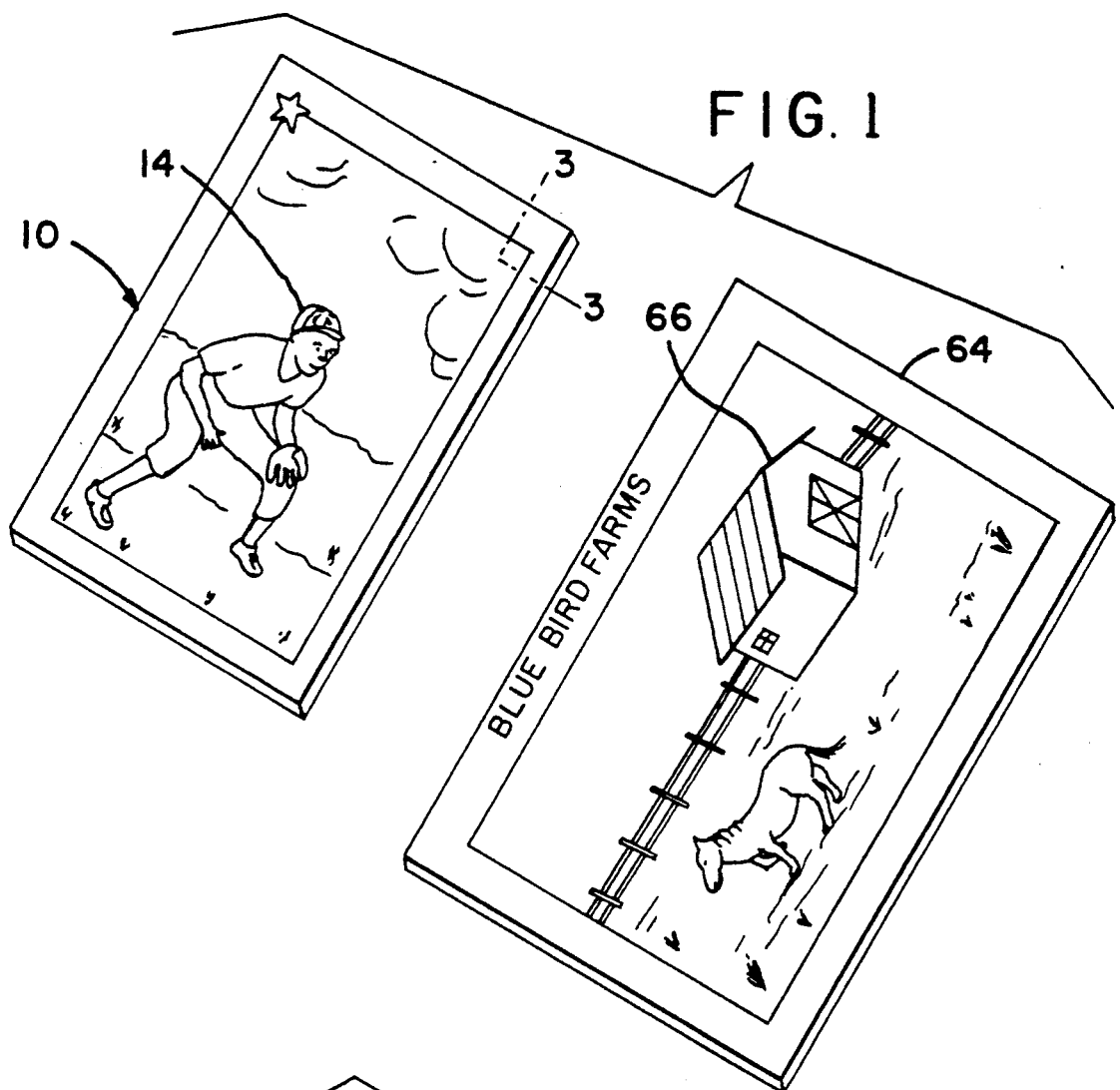
FIG. 1 is a schematic, perspective view of a pair of image bearing handleable cards in accordance with the invention.

Referring now to FIG. 1, the pair of illustrative cards of the type that are handled are shown relative to a sports card 10 and a postcard 64. Both cards include images on the front or top surface thereof and images or other data on the back or bottom side surfaces thereof. In prior art practice, the cards 10 and 64 are typically printed on stock of an appropriate thickness, in the range of 0.020 inches for card 10 and 0.010 inches for card 64, many standard well known color printing processes being able to accommodate these relatively thick stocks. On occasion, the cards are laminated of thinner but still relatively thick stock. Such thicknesses have become acceptable with the cards having a resistance to tearing, a resistance to bending, a certain feel and handleability with appropriate resistance to smearing offered by standard printing processes. Sometimes these printing processes are enhanced with coatings that protect the color transfer to the surfaces of the cards during printing.

Figure 2:
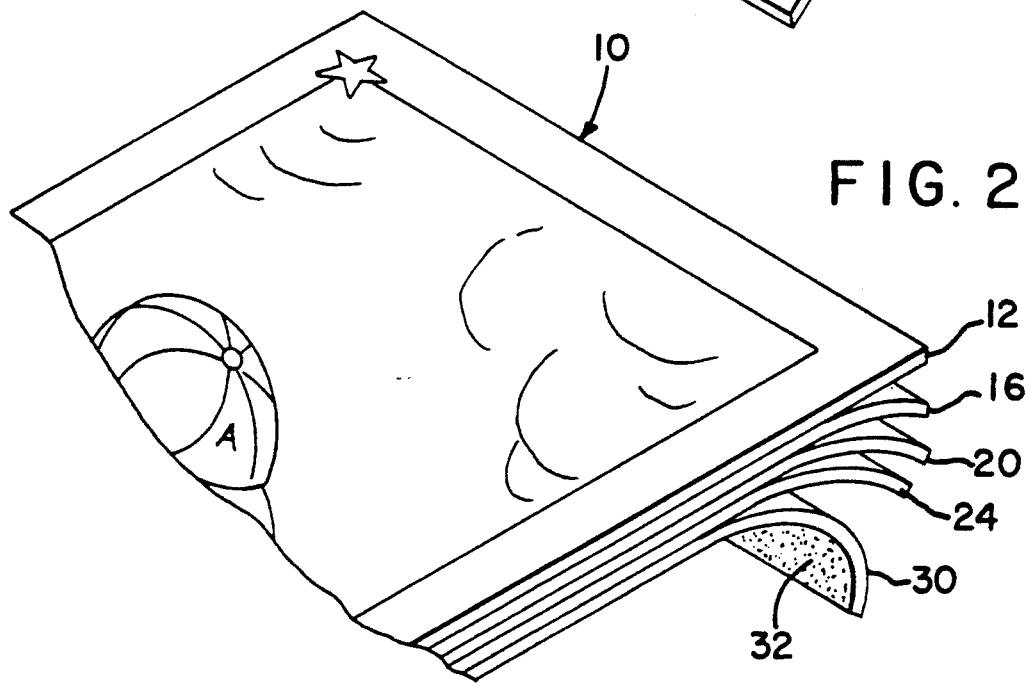
FIG. 2 is an enlarged view of the end of the leftmost card in FIG. 1 with the lamina of the end of the card peeled apart to show details.
Figure 3:
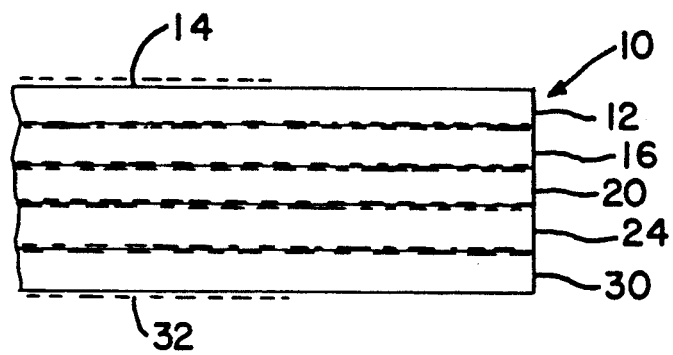
FIG. 3 is a side, elevational, and sectional view of the end of the card taken along lines 3—3 of the card shown in FIG. 1 included to depict the details of lamination in a preferred card embodiment.

With respect to the cards 10 and 64 shown in FIG. 1, the overall dimensions are identical to the dimensions of the prior art cards, but each of the cards is formed of a lamination to include, with respect to the front and/or back surfaces, thin, flexible, and opaque sheet material that has had the images and/or data on the surfaces formed by the use of electrophotographic processes, including the deposition of toner particles and the fixing of such particles onto the surfaces. An appropriate thickness and stiffness is given to the cards by the addition of one or more layers of adhesive or core material with the card being laminated and bonded through the use of an additional step of compression and heat. Turning to FIG. 2, the card 10 may be seen to include an image formed on the upper surface thereof through toner particles 14 with an image or data formed on the bottom surface through toner particles 32. As can also be seen in FIG. 2 through the splitting of the lamination forming card 10, the card structure includes an upper sheet 12 and a lower sheet 30 that carry the toner particles, electrophotographically formed thereon, and a core formed of sheets 16, 20, and 24 extending between the sheets 12 and 30. Referring to FIG. 3, the sheets may be seen in lamination with an adhesive material 18 bonding the sheet 16 to sheets 12 and 20, and with a similar adhesive 22 bonding the sheet 24 to sheets 20 and 30. As can also be seen, toner particles extend over substantial areas of the card surfaces of 12 and 30. The various sheets 12, 16, 20, 24, and 30 are laminated together to form an integral structure.

Figure 4:
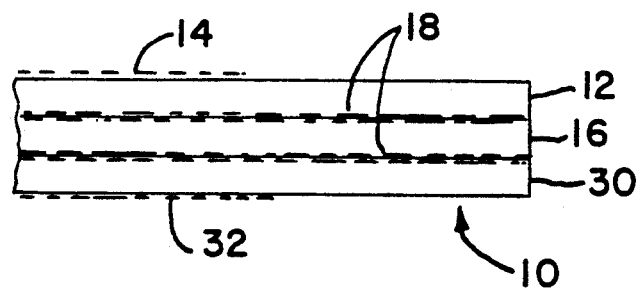
FIG. 4 is a side, elevational, and sectional view of the end of a card showing laminar detail in an alternative embodiment.

It has been discovered that the lamination of such sheets provides a structure similar to those cards formed of one or two layers in accordance with the prior art. It has also been discovered that the toner particles 14 forming a color image on the front of the card particles 32 forming a further image or data on the back of the card are enhanced by the step of lamination which includes heat and compression in a manner to be described with respect to the invention method of manufacture. This enhancement, which tempers the toner, is important to the invention which utilizes toner particles that are relatively thickly applied for certain colors, such as black or other dark colors, and benefit in terms of consistency and actual appearance following a subsequent fixing step. This is particularly true with respect to images which cover substantial portions, frequently 50 percent of the card area, as is the case in multi-color imaging used for sports and postcards, and numerous other cards, particularly on one side. The discovery of this added quality of the card flowing from lamination carries with it the need for care to be taken in terms of the temperature and pressure used to avoid dislodging toner particles or forming flakes or areas readily cracked or fractured on the card surface. FIG. 4 shows an alternative card construction which is thinner than the card shown in FIG. 3; the card in FIG. 3 representing a preferred embodiment for the so-called sports card and the card in FIG. 4 representing an embodiment preferred for postcard construction like that of 64. With respect to FIG. 4, the core formed by sheet 16 may be made by utilizing a very thin sheet, a tissue-paper like sheet, coated with a thermal adhesive to add to thickness with such coating being slightly reduced during compression and reflow of the adhesive.

Figure 5:
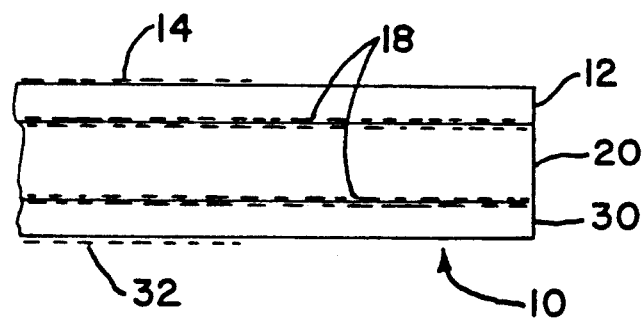
FIG. 5 is a side, elevational, and sectional view of an end of a card showing yet another embodiment in terms of lamination.

FIG. 5 shows yet another alternative embodiment wherein the core sheet 20 is shown relatively thicker than the core sheet 20 in FIG. 3 to illustrate that the invention contemplates the use of cores of different thickness, selected appropriately for the use, sports card, postcard, or other card. With respect to FIG. 5, the sheet 20 may be of paper or plastic, suitably coated with a dry adhesive, preferably thermally activated during lamination and compression of a stack of sheets 12, 20, and 30.

Figure 6:
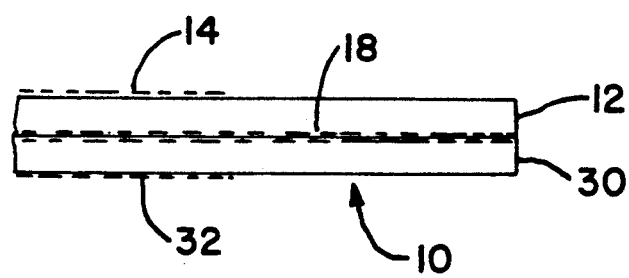
FIG. 6 is a side, elevational view of the end of a card showing a still further embodiment.

FIG. 6 illustrates yet a further embodiment wherein the core is formed by an adhesive 18 applied to the inner surface of either or both the sheets 12 and 30, again preferably a dry adhesive that can be thermally activated after the sheets are stacked and aligned so that the images formed by toner particles formed by 14 and 32 are aligned in a sense transverse to the sheet thickness.

The invention contemplates also having an outside lamination blank or conventionally printed. Referring now to FIG. 7, the invention method is shown in a preferred embodiment through the schematic representation of elements with the process steps labeled I-V in the view.

In accordance with the preferred process of manufacturing cards, machines 40 and 42 capable of producing electrophotographic depositions are provided to produce a pair of sheets 44 and 46, each of an area substantially larger than the area of the cards. Card representations 10 and 30 are indicated with respect to sheets 44 and 46 in FIG. 7. The first step of one embodiment of the process of the invention, Step I, is then the rendering of electrophotographic images in multiple colors and in multiple images on a sheet of material substantially larger in area than the area of the individual cards; although single images covering an entire card are also contemplated. With the sheet so formed, the second step, Step II, comprises the addition of core sheets, including sheets 48, 50, and 52. These sheets correspond in terms and function to the sheets 16, 20, and 24, described with respect to FIG. 3. They are, respectively, an adhesive sheet 48, a filler and thickening sheet 50, and an adhesive sheet 52. The third step to the invention, Step III, is comprised of justifying or aligning the images on the upper surface of sheet 44, namely, the images forming cards 10 with the images on the bottom sheet 46, namely, the images 30. This may be readily accomplished by arranging the various sheets 44-52 such that the sheets may be arranged with one edge aligned to define an X alignment, and an adjoining edge aligned, forming a Y alignment. With the sheets so aligned and with the images of the top and bottom sheets aligned with each other, the invention contemplates insertion of the stack of sheets into a carrier 56, the stack is shown as 54 in FIG. 7. The carrier is itself a folder of sheet material preferably coated to preclude transfer of toner material to the inside of the carrier and accordingly, removal of any toner from the stack. Step IV of the process includes feeding the carrier 56 through a heat, pressure station including heated plates 57 and a set of pressure rollers 58 to compress and cause a reflow of the adhesive of the sheets 48 and 52, and an additional tempering and fixing of the toner on the upper and lower sheets. This results in a laminated integral structure 60 which is then in a fifth process step, Step V, slit apart to define the individual cards 10 with the parts of sheets 44-52 shown as 62 removed and discarded. The invention contemplates that multiple laminated stacks may be slit commonly with stacks of cards 1-6 formed thereby.

In accordance with the invention, the machines 40 and 42 utilize an electrophotographic process capable of rendering multiple colors to the images. Machines such as this are well known, and U.S. Pat. No. 5,014,094, issued May 7, 1991 discloses one such machine that includes a laser beam scanning type wherein an original image is laser beam scanned with information as to color separated by filters and then subsequently utilized to transfer different color images onto a transfer sheet which is subsequently fixed in a heating and pressure station utilizing rollers applied to the sheet following a toner deposition. A Canon CLC500 was employed using the following sheet of parameter details.

The sheets 44 and 46 may have one or many different images on them, such sheets typically being of a 11 by 17 or 8½ by 11 inch dimension, with a thickness varying between 0.003 and 0.006 inches, typically being 0.004 inches in thickness. The so-called laser print quality of paper is preferred rather than bond or other paper although the invention contemplates the use of commercial paper developed for, but not limited to, laser xerography. Such paper may be procured through the Hammermill Company which offers paper described as Hammermill Laser Print (TM). Other similar papers may be employed, from Weyerhauser, for example. Generally, these papers are specially formulated having a very smooth surface. For quality, xerography with high resolution image setters and color laser copiers/printers should be used. Papers of 24 lbs. and 32 lbs. weight (bond 17"×22") and as low as 16 lbs. may be used. Paper as heavy as Bristol cover stock have been coated on one side. This paper is 0.012 inches thick, and the Laser Master Image Setter, black and white for the data side of the card was used, for example. The sheets 48 and 52 are typically a tissue paper type sheet on the order of 0.003 inches in thickness to which is added an adhesive making the sheets on the order of 0.005 inches in thickness. A core sheet 50 on the order of 0.004 inches in thickness was utilized in an actual embodiment with the overall thickness of the stack on the order of 0.020 inches prior to lamination and compression and slightly less following such step. Laminating materials may include drymount tissue, a paper with adhesive, a polyester based film with adhesive, or a polyolefin based film with adhesive. In accordance with the invention, the additional heating and compression step, which results in the lamination of the integral structure, as well as an additional fixing and tempering of toner on sheets 44 and 46, was accomplished through an apparatus made by Graphics Laminating, Inc. of Solon, Ohio. The temperature of the heating plates was set at 200°±25° F. for drymount tissue uses and 250°±5° F. for film uses. Pressure was set on the order of 125 ft-lbs at the roller junction. During the laminating process, it is important that sufficient pressure be used to assure no bubbles in the laminate and a good, solid reflow of adhesive and bonding of the different sheets.

As can be appreciated from the additional rendition of the invention card shown in FIGS. 4-6, the invention contemplates a modification of the process heretofore described to suit the constructions employed. The invention also contemplates, as part of the method, depending upon the card to be manufactured, a selection of the thickness of the inner sheets, including specifically the core 20 to get an appropriate card thickness, stiffness, bendability and feel. The invention contemplates variations on these parameters as long as a proper card is produced in terms of handleability, feel, lack of bending and appearance.

Having now described the invention in terms intended to enable a preferred practice thereof, claims are set forth intended to define what is inventive.

We claim:

1. As an article of manufacture, a card comprised of:
   (a) front and back sheets of opaque material, each of said front and back sheets having an inner and an outer surface, each said outer surface having an image formed by toner particles electrophotographically deposited thereon;
   (b) at least a further sheet providing a core extending between said inner surfaces of said front and back sheets; and
   (c) adhesive layers bonding each of said front and back sheets to said further sheet to provide an integral laminar structure of a thickness and stiffness to make the card handleable.

2. The card of claim 1 characterized in that the said structure is on the order of between 0.008 to on the order of 0.020 inches in thickness.

3. The card of claim 1 characterized in that the said front and back sheets are each on the order of from 0.003 to on the order of 0.006 inches in thickness.

4. The card of claim 1 characterized in that the said core is on the order of 0.003 to on the order of 0.014 inches in thickness.

5. The card of claim 1 characterized in that the said adhesive is a thermal adhesive having a preheated dry state to facilitate alignment between said front and back sheets.

6. The card of claim 1 characterized in that the said front and back sheets are laser print paper.

7. The card of claim 1 characterized in that the said images are related in content between the front and back sheets.

8. The card of claim 1 characterized in that the said toner particles cover an area of at least the front sheet in excess of 50 percent of the surface thereof.

9. The card of claim 1 characterized in that the said toner particles are of multiple colors to form a color image.

10. The card of claim 1 characterized in that said toner particles are secured to said front and back sheets by the application of heat and pressure thereto and said adhesive layers bond each of said front and back sheets to said further sheet in conjunction with said application of heat and pressure to effect the said bond and fix the toner particles to the surfaces of the front and back sheets.

11. As an article of manufacture, a card comprised of:
   (a) front and back sheets of opaque material having color images on at least one of said front and back sheets formed by the electrophotographic deposition and fixing of multiple colors of toner particles,
   (b) a core sheet to provide thickness and stiffness to the card, and
   (c) thermal adhesive sheets extending between the core sheet and the front and back sheets, the front, back, core and adhesive sheets providing an integral laminar structure with the front, back, core and adhesive sheets permanently bonded together and the toner images rendered handleable by the application of heat and pressure thereto with the front and back sheets having a thickness on the order of between 0.003 and 0.005 inches, the core sheet having a thickness on the order of between 0.003 and 0.005 inches and the adhesive sheets having a thickness on the order of 0.003 and 0.010 inches with overall thickness of the card being on the order of between 0.008 and 0.020 inches in thickness.

12. The card of claim 11 further characterized in that the card area is from 2 to 5 inches on a side and 3 to 8 inches in length.

* * * * *